(12) United States Patent
Park et al.

(10) Patent No.: US 9,455,591 B2
(45) Date of Patent: Sep. 27, 2016

(54) POWER SUPPLY

(71) Applicant: SOLUM CO., LTD., Suwon-si (KR)

(72) Inventors: Gyu Min Park, Suwon-si (KR); Nam Jin Park, Suwon-si (KR); Sang Gab Park, Suwon-si (KR); Kwang Seung Cho, Suwon-si (KR)

(73) Assignee: SOLUM CO., LTD, Suwon-si (KR)

( * ) Notice: Subject to any disclaimer, the term of this patent is extended or adjusted under 35 U.S.C. 154(b) by 160 days.

(21) Appl. No.: 14/536,065

(22) Filed: Nov. 7, 2014

(65) Prior Publication Data

US 2015/0130425 A1 May 14, 2015

(30) Foreign Application Priority Data

Nov. 8, 2013 (KR) .................. 10-2013-0135519

(51) Int. Cl.
*H02J 7/00* (2006.01)
*H02J 7/34* (2006.01)

(52) U.S. Cl.
CPC .............. *H02J 7/008* (2013.01); *H02J 7/0013* (2013.01); *H02J 7/345* (2013.01)

(58) Field of Classification Search
CPC ......... H02J 7/008; H02J 7/0013; H02J 7/345
USPC ....................................................... 320/167
See application file for complete search history.

(56) References Cited

U.S. PATENT DOCUMENTS

| | | | | |
|---|---|---|---|---|
| 4,237,899 A * | 12/1980 | Hagfors | ............. | A61N 1/36021 607/46 |
| 5,812,383 A * | 9/1998 | Majid | ............... | H02M 3/33523 363/19 |
| 6,433,443 B2 * | 8/2002 | Nishida | ............................ | 307/35 |
| 6,977,823 B2 * | 12/2005 | Yang | ................. | H02M 3/33592 363/132 |
| 7,525,819 B2 * | 4/2009 | Choi | ....................... | H02M 1/36 323/238 |
| 7,646,108 B2 * | 1/2010 | Paillet | .................. | H02M 3/158 307/11 |
| 7,652,898 B2 * | 1/2010 | Kim | ........................ | H02M 1/36 323/901 |
| 7,821,251 B2 * | 10/2010 | Alfano | ............... | G01R 19/0092 324/117 R |
| 8,218,995 B2 * | 7/2012 | Kim | ....................... | G03G 15/80 399/37 |
| 8,325,503 B2 * | 12/2012 | Nagasaki | .............. | H02M 7/103 323/222 |
| 8,446,129 B2 * | 5/2013 | Chen | ................ | H02M 3/33515 320/107 |
| 9,099,927 B2 * | 8/2015 | Choi | | |
| 9,214,905 B2 * | 12/2015 | Okajima | ............... | H03F 1/0261 |

FOREIGN PATENT DOCUMENTS

KR   10-2013-0076295 A   7/2013

* cited by examiner

*Primary Examiner* — Sun Lin

(74) *Attorney, Agent, or Firm* — Sughrue Mion, PLLC

(57) ABSTRACT

Embodiments of the invention provide a power supply including a transformer comprising a single output terminal on a secondary side, a first output unit comprising a first capacitor and connected to the single output terminal to output a first output voltage, a second output unit comprising a second capacitor having a larger capacity than the first capacitor and connected to the single output terminal to output a second output voltage, and a controller configured to control the first output voltage to be output until power is applied and charging of the second capacitor is started.

20 Claims, 5 Drawing Sheets

POWER SUPPLY

CROSS REFERENCE TO RELATED APPLICATION

This application claims the benefit of and priority under 35 U.S.C. §119 to Korean Patent Application No. KR 10-2013-0135519, entitled "POWER SUPPLY," filed on Nov. 8, 2013, which is hereby incorporated by reference in its entirety into this application.

BACKGROUND

1. Field of the Invention

The present invention relates to a power supply, and more particularly, to a power supply that can achieve circuit miniaturization, reduction in the number of components, and cost reduction as well as reduction in startup time in a power supply employing an output configuration for reduction in standby power 2. Description of the Related Art In recent times, as the awareness of environmental issues increases, most electronic products are designed to have energy-saving functions. In particular, research for reducing standby power in standby mode has been continuously conducted.

At this time, the standby power means power consumed in standby mode that does not perform the major function of the corresponding electronic product or waits an ON signal from the outside in a state in which the electronic product is connected to the external power and includes both of power consumption when power is turned off and power consumption at the time of non-use during operation. Thus, the standby power is the power consumed in the standby mode of the electronic product and means the power wasted regardless of the original functions of the electronic product, such as computer signal standby, remote controller signal standby, and timer or monitor display.

As a method for reducing the above standby power, recently, a method of applying a large capacitor to an output terminal that outputs an output voltage has been highlighted. Thus, it is possible to reduce standby power in standby mode by employing a method of charging a large capacitor positioned in an output terminal, stopping operation of a primary-side IC in standby mode, and discharging the large capacitor.

However, when the large capacitor is applied to a power supply as discussed above, since it takes a long time to charge the large capacitor and thus startup (power-on and implementation of a desired output level, for example, power-on and acquisition of a user's desired output voltage) is not possible until the capacitor is fully charged, it takes a long time to start the power supply.

Further, in recent times, since the price of the electronic products becomes lower due to intense competition, in case of a power supply employing an output configuration for reduction in standby power, it is needed to develop a technology that can achieve cost reduction and circuit miniaturization as well as reduction in startup time Related Art Documents: Korean Patent Publication No. 10-2013-0076295

SUMMARY

Accordingly, embodiments of the invention have been made to overcome the above-described problems, and therefore, embodiments of the invention provide a power supply that can achieve circuit miniaturization, reduction in the number of components, and cost reduction as well as reduction in startup time in a power supply employing an output configuration for reduction in standby power by implementing an output configuration for reduction in standby power and an output configuration for reduction in startup time together in a secondary-side single output terminal of a transformer.

In accordance with at least one embodiment, there is provided a power supply including a transformer having a single output terminal on a secondary side, a first output unit including a first capacitor and connected to the single output terminal to output a first output voltage, a second output unit including a second capacitor having a larger capacity than the first capacitor and connected to the single output terminal to output a second output voltage, and a controller for controlling the first output voltage to be output until power is applied and charging of the second capacitor is started.

In accordance with at least one embodiment, the controller controls the second output voltage to be output with the first output voltage until the charging of the second capacitor is started and the charging of the second capacitor is completed and control the second output voltage to be output without outputting the first output voltage after the charging of the second capacitor is completed.

In accordance with at least one embodiment, the first output unit includes a first switching unit connected to the single output terminal and the first capacitor; and a first diode connected to the first switching unit to output the first output voltage.

In accordance with at least one embodiment, the second output unit includes a second switching unit connected to the single output terminal, a second diode connected to the second switching unit and the second capacitor, and a third diode connected to the second capacitor and the second diode to output the second output voltage.

In accordance with at least one embodiment, the controller outputs a first control signal for controlling on/off of the first switching unit to the first switching unit and outputs a second control signal for controlling on/off of the second switching unit to the second switching unit.

In accordance with at least one embodiment, the controller outputs the second control signal of a level, which turns off the second switching unit, to the second switching unit while outputting the first control signal of a level, which turns on the first switching unit, to the first switching unit until the power is applied and the charging of the second capacitor is started, outputs the second control signal of a level, which turns on the second switching unit, to the second switching unit while outputting the first control signal of the level, which turns on the first switching unit, to the first switching unit until the charging of the second capacitor is started and the charging of the second capacitor is completed, and outputs the second control signal of the level, which turns on the second switching unit, to the second switching unit while outputting the first control signal of a level, which turns off the first switching unit, to the first switching unit after the charging of the second capacitor is completed.

In accordance with at least one embodiment, the controller includes a first voltage division unit connected in parallel to the second capacitor to divide a voltage of the second capacitor, a third switching unit applied with the voltage divided by the first voltage division unit, a fourth switching unit connected to the first switching unit and the third switching unit, a second voltage division unit connected in parallel to the first capacitor to divide a voltage of the first capacitor, a fifth switching unit connected to the second voltage division unit and the second switching unit, and a third capacitor connected to the second voltage division unit and the fifth switching unit to charge the voltage divided by the second voltage division unit.

In accordance with at least one embodiment, the controller further includes a comparator connected to the third capacitor and the fifth switching unit.

In accordance with at least one embodiment, the comparator outputs an output voltage having a high level to the fifth switching unit when a voltage of the third capacitor is higher than a preset reference voltage and outputs an output voltage having a low level to the fifth switching unit when the voltage of the third capacitor is lower than the reference voltage.

In accordance with at least one embodiment, the power supply further includes a fourth capacitor between a terminal, which outputs the first output voltage and the second output voltage, and a ground to stabilize the first output voltage and the second output voltage.

In accordance with at least one embodiment, the controller controls the second output voltage to be output with the first output voltage after the charging of the second capacitor is started.

In accordance with at least one embodiment, the first output unit is connected to the single output terminal and the first capacitor to output the first output voltage.

In accordance with at least one embodiment, the second output unit includes a second switching unit connected to the single output terminal, a second diode connected to the second switching unit and the second capacitor, and a third diode connected to the second capacitor and the second diode to output the second output voltage.

In accordance with at least one embodiment, the controller outputs a second control signal for controlling on/off of the second switching unit to the second switching unit.

In accordance with at least one embodiment, the controller outputs the second control signal of a level, which turns off the second switching unit, to the second switching unit until the power is applied and the charging of the second capacitor is started and outputs the second control signal of a level, which turns on the second switching unit, to the second switching unit after the charging of the second capacitor is started.

In accordance with at least one embodiment, the controller includes a second voltage division unit connected in parallel to the first capacitor to divide a voltage of the first capacitor, a fifth switching unit connected to the second voltage division unit and the second switching unit, and a third capacitor connected to the second voltage division unit and the fifth switching unit to charge the voltage divided by the second voltage division unit.

In accordance with at least one embodiment, the controller further includes a comparator connected to the third capacitor and the fifth switching unit.

In accordance with at least one embodiment, the comparator outputs an output voltage having a high level to the fifth switching unit when a voltage of the third capacitor is higher than a preset reference voltage and output an output voltage having a low level to the fifth switching unit when the voltage of the third capacitor is lower than the reference voltage.

In accordance with at least one embodiment, the power supply further includes a fourth capacitor between a terminal, which outputs the first output voltage and the second output voltage, and a ground to stabilize the first output voltage and the second output voltage.

In accordance with at least one embodiment, the first capacitor is an electrolytic capacitor, and the second capacitor is an electrolytic capacitor or an electric double layer capacitor Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
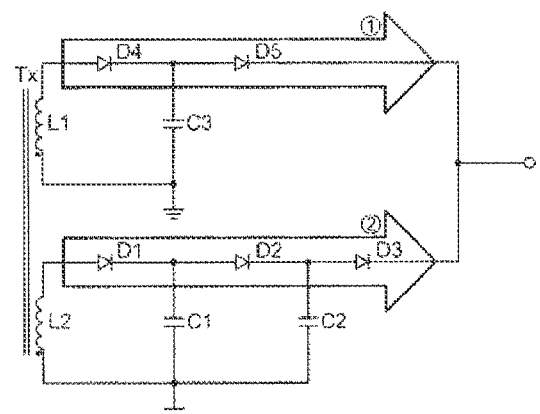
FIG. 1 is a circuit diagram of a conventional power supply employing a large capacitor to reduce standby power.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

FIG. 1 is a circuit diagram of a conventional power supply employing a large capacitor to reduce standby power. As shown in FIG. 1, the typical power supply 100 includes a transformer Tx (L1, L2), diodes D1 to D5, and capacitors C1 to C3.

The above power supply 100 includes a plurality of output terminals L1 and L2, which output a DC voltage, by forming a plurality of (two) secondary sides in one transformer Tx. At this time, the large capacitor C2 is applied to the second output terminal 12 to reduce standby power.

The above power supply 100 that employs the large capacitor C2 as an output capacitor has a long charging time. Therefore, since the above power supply 100 cannot obtain an output voltage desired by a user until the large capacitor C2 is fully charged even when power is applied, it takes a long time for the power supply 100 to start.

Thus, in the power supply 100 of FIG. 1, the typical output capacitor C3 having a smaller capacity than the large capacitor C2 is applied to the first output terminal L1 which is a separate output terminal to output the output voltage desired by the user within a short time through a path of a direction ① of the first output terminal L1 until the large capacitor C2 of the second output terminal L2 is fully charged, thus reducing the startup time of the power supply 100. After that, the power supply 100 can output the output voltage even through a path of a direction ② of the second output terminal L2 when the large capacitor C2 is fully charged.

The conventional power supply 100 using the above method can overcome the problem when the large capacitor C2 is applied to reduce standby power, that is, the problem that the startup time is long by applying output capacitor C3 having a smaller capacity to the separate secondary output terminal L1.

However, the conventional power supply 100 using the above method needs the output terminal L2 for reducing standby power and the output terminal L1 for reducing startup time on the secondary side of the transformer Tx, respectively. Thus, the above power supply 100 needs the two output terminals L1 and L2 on the secondary side of the transformer Tx.

Therefore, in the above conventional power supply 100, secondary-side winding of the transformer is increased, resulting in an increase in the volume of the transformer. Accordingly, the number of components (for example, the high-current output diodes D4 and D5 and the output capacitor C3 implemented in the first output terminal L1) is also increased, thus being a significant burden in terms of circuit miniaturization and cost.

Thus, embodiments of the present invention employ a power supply that can achieve circuit miniaturization and cost reduction through reduction in the number of components as well as reduction in startup time by implementing an output configuration for reduction in standby power and an output configuration for reduction in startup time together in a secondary-side single output terminal of a transformer. This will be described in detail below.

First Embodiment

Figure 2:
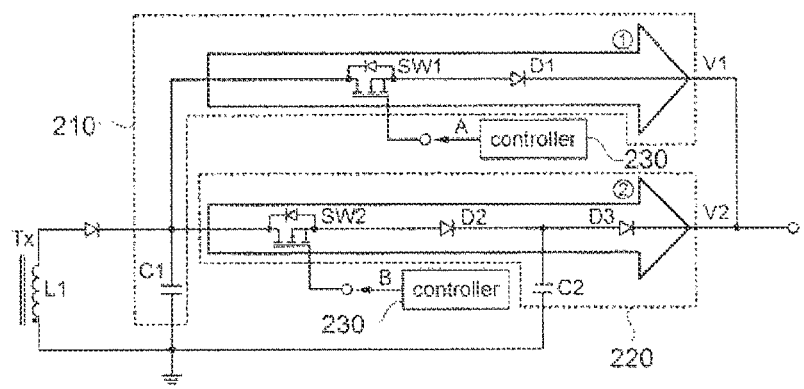
FIG. 2 is a schematic circuit diagram of a power supply in accordance with a first embodiment of the invention.

FIG. 2 is a schematic circuit diagram of a power supply in accordance with a first embodiment of the invention. As shown in FIG. 2, the power supply 200 according to at least one embodiment includes a transformer Tx, a first output unit 210, a second output unit 220, and a controller 230.

In accordance with at least one embodiment, the transformer Tx includes a primary coil (not shown), which receives DC power from a primary side and a secondary coil electromagnetically coupled to the primary coil.

In accordance with at least one embodiment, the transformer Tx includes a single output terminal L1 on a secondary side, unlike the transformer in FIG. 1. Therefore, it is possible to contribute to the overall miniaturization of the power supply by reducing secondary-side winding than the transformer in FIG. 1 to remarkably reduce the volume of the transformer.

In accordance with at least one embodiment, the first output unit 210, as shown in FIG. 2, includes a first capacitor C1 and be connected to the secondary-side single output terminal L1 of the transformer Tx to output a first output voltage V1.

In accordance with at least one embodiment, the first capacitor C1 is a capacitor having a smaller capacity than a second capacitor C2 of the second output unit 220, which will be described later, and any type of capacitor, such as a universal electrolytic capacitor, is used if it can output the first output voltage V1 within a short time until power is applied and charging of the second capacitor C2 is started.

In accordance with at least one embodiment, the second output unit 220, as shown in FIG. 2, includes the second capacitor C2 and is connected to the secondary-side single output terminal L1 of the transformer Tx to output a second output voltage V2.

In accordance with at least one embodiment, the second capacitor C2 has a larger capacity than the first capacitor C1, and a large capacitor, such as an electric double layer capacitor, can be mainly employed as the second capacitor C2. However, the second capacitor C2 is not necessarily limited to the above capacitor and any type of capacitor having a larger capacity than the first capacitor C1, such as a universal electrolytic capacitor, can be used if it can output an output voltage (standby voltage etc.) for reduction in standby power.

In accordance with at least one embodiment, the controller 230 controls the first output voltage V1 to be output until the power is applied to the power supply and the charging of the second capacitor C2 is started. This will be described in detail in the following operation process.

Figure 3:
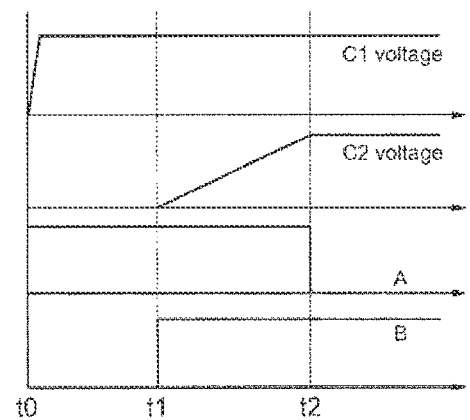
FIG. 3 is a view showing a control sequence related to the power supply in accordance with the first embodiment of the invention.
Figure 4:
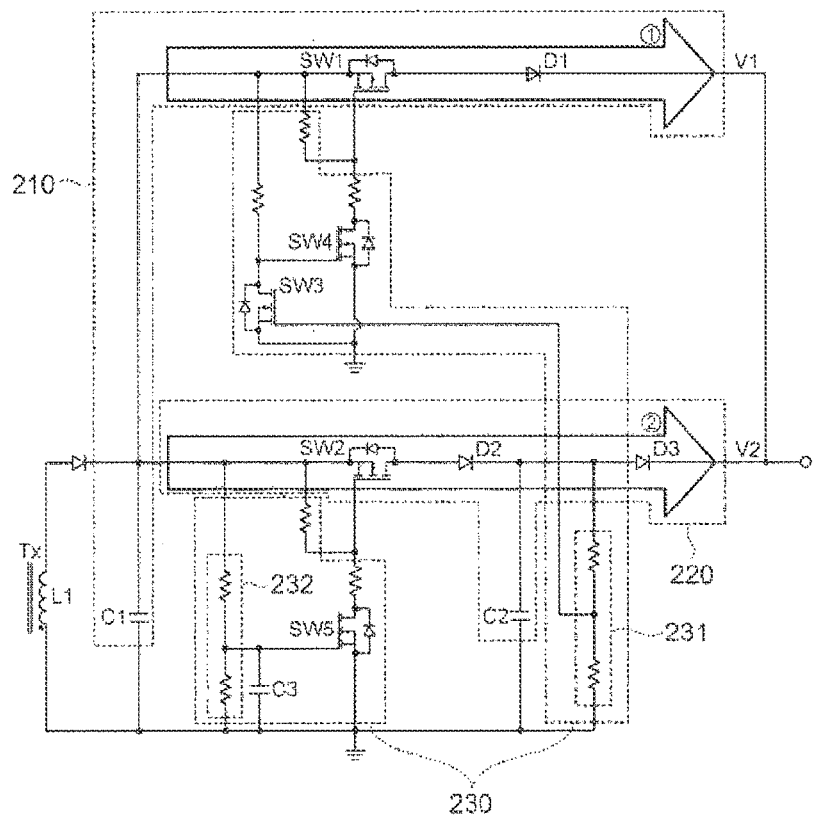
FIG. 4 is a detailed circuit diagram of the power supply of FIG. 2 in accordance with the first embodiment of the invention.

Meanwhile, FIG. 3 is a view showing a control sequence related to the power supply in accordance with the first embodiment of the invention, and FIG. 4 is a detailed circuit diagram of the power supply of FIG. 2 in accordance with the first embodiment of the invention. Hereinafter, detailed configuration and operation of the above-described power supply 200 of the present embodiment will be described with reference to FIGS. 2 to 4.

First, the first output unit 210 according to at least one embodiment, as shown in FIGS. 2 and 4, includes a first switching unit SW1 and a first diode D1.

As shown in FIGS. 2 and 4, the first switching unit SW1 is connected to the secondary-side single output terminal L1 of the transformer Tx and the first capacitor C1, and the first diode D1 are connected to the first switching unit SW1 to output the first output voltage V1.

In accordance with at least one embodiment, the first switching unit SW1 is implemented with a P-channel field effect transistor (FET), but the embodiments of this invention are not limited thereto and any transistor, such as a universal transistor, can be used if it is a switching element that can be turned on/off.

In accordance with at least one embodiment, the second output unit 220, as shown in FIGS. 2 and 4, includes a second switching unit SW2, a second diode D2, and a third diode D3.

In accordance with at least one embodiment, the second switching unit SW2, as shown in FIGS. 2 and 4, is connected to the secondary-side single output terminal L1 of the transformer Tx.

In accordance with at least one embodiment, the second switching unit SW2 is implemented with a P-channel FET like the first switching unit SW1, but the embodiments of the invention are not limited thereto and any transistor, such as a universal transistor, can be used if it is a switching element that can be turned on/off.

In accordance with at least one embodiment, the second diode D2, as shown in FIGS. 2 and 4, is connected to the second switching unit SW2 and the second capacitor C2 to charge the second capacitor C2 when the second switching unit SW2 is turned on.

In addition, as shown in FIGS. 2 and 4, the third diode D3 is connected to the second diode D2 and the second capacitor C2 to output the second output voltage V2.

Further, as shown in FIGS. 2 and 3, in accordance with at least one embodiment, the controller 230 outputs a first control signal A for controlling on/off of the first switching unit SW1 to the first switching unit SW1 and outputs a second control signal B for controlling on/off of the second switching unit SW2 to the second switching unit SW2.

In accordance with at least one embodiment, as shown in FIG. 3, the level of the first control signal A for turning on the first switching unit SW1 is set to a high level, and the level of the first control signal A for turning off the first switching unit SW is set to a low level, but the level of the first control signal A is not necessarily limited thereto. Thus, the level of the first control signal A for turning on the first switching unit SW1 is set to a low level, and the level of the first control signal A for turning off the first switching unit SW1 may be set to a high level.

In accordance with at least one embodiment, as shown in FIG. 3, the level of the second control signal B for turning on the second switching unit SW2 is set to a high level, and the level of the second control signal B for turning off the second switching unit SW2 is set to a low level, but the level of the second control signal B is not necessarily limited thereto. Thus, the level of the second control signal B for turning on the second switching unit SW2 may be set to a low level, and the level of the second control signal B for turning off the second switching unit SW2 may be set to a high level.

In accordance with at least one embodiment, as shown in FIG. 4, the controller 230 includes a first voltage division unit 231, a third switching unit SW3, a fourth switching unit SW4, a second voltage division unit 232, a fifth switching unit SW5, and a third capacitor C3.

As shown in FIG. 4, the first voltage division unit 231 is connected in parallel to the second capacitor C2 to divide a voltage of the second capacitor C2.

As shown in FIG. 4, the voltage divided by the first voltage division unit 231 is applied as a driving voltage of the third switching unit SW3.

As shown in FIG. 4, the fourth switching unit SW4 is connected to the first switching unit SW1 and the third switching unit SW3 to turn on/off the first switching unit SW1 of the first output unit 210 according to turn-on/off of the third switching unit SW3.

In accordance with at least one embodiment, the third and fourth switching units SW3 and SW4 are implemented with an N-channel FET, but the embodiments of the invention are not limited thereto and any transistor, such as a universal transistor, can be used if it is a switching element that can be turned on/off.

As shown in FIG. 4, the second voltage division unit 232 is connected in parallel to the first capacitor C1 to divide a voltage of the first capacitor C1.

As shown in FIG. 4, the fifth switching unit SW5 is connected to the second voltage division unit 232 and the second switching unit SW2 of the second output unit 220 to turn on/off the second switching unit SW2 according to the voltage divided by the second voltage division unit 232.

In accordance with at least one embodiment, the fifth switching unit SW5 is implemented with an N-channel FET like the third and fourth switching units SW3 and SW4, but the embodiments of the invention are not limited thereto and any transistor, such as a universal transistor, can be used if it is a switching element that can be turned on/off.

As shown in FIG. 4, the third capacitor C3 is connected to the second voltage division unit 232 and the fifth switching unit SW5.

Figure 5:
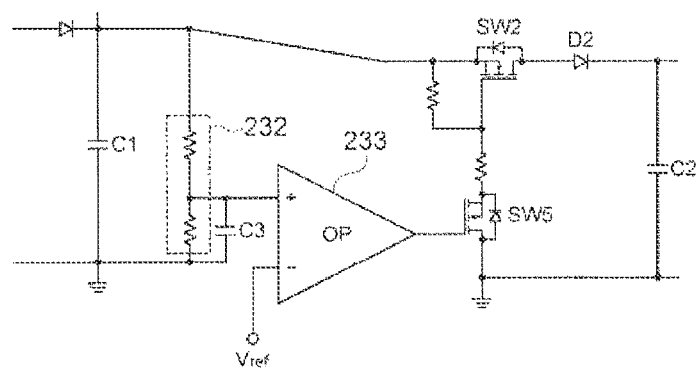
FIG. 5 is a circuit diagram in which a comparator is applied to a controller of FIG. 4 in accordance with the first embodiment of the invention.

Meanwhile, FIG. 5 is a view showing a circuit in which a comparator is applied to the controller 230 of FIG. 4. As shown in FIG. 5, the controller 230 according to at least one embodiment further includes a comparator 233 connected to the third capacitor C3 and the fifth switching unit SW5.

In accordance with at least one embodiment, the comparator 233 compares the voltage charged in the third capacitor C3 with a preset reference voltage Vref. At this time, as an example, the reference voltage Vref is set to a turn-on voltage that can turn on the fifth switching unit SW5.

As an example, the comparator 233 includes a first input terminal, a second input terminal, and an operational amplifier (OP). As shown in FIG. 5, the first input terminal is a non-inverting input terminal, and the second input terminal is an inverting input terminal.

In accordance with at least one embodiment, the first input terminal receives the voltage charged in the third capacitor C3, and the second input terminal receives the preset reference voltage Vref.

Further, the OP outputs a comparative output voltage according to the result of the comparison between the voltage charged in the third capacitor C3 and the preset reference voltage Vref to the fifth switching unit SW5.

In accordance with at least one embodiment, the comparator 233 compares the voltage charged in the third capacitor C3 with the preset reference voltage Vref, outputs an output voltage having a high level to the fifth switching unit SW5 when the voltage of the third capacitor C3 is higher than the preset reference voltage Vref, and outputs an output voltage having a low level to the fifth switching unit SW5 when the voltage of the third capacitor C3 is lower than the reference voltage Vref, through the OP.

Figure 6:
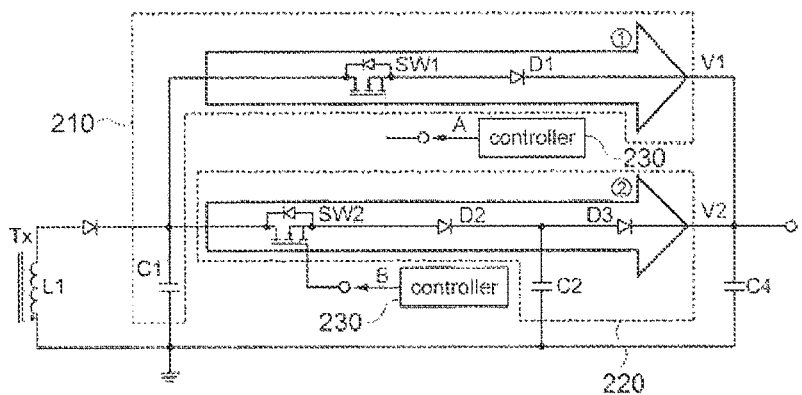
FIG. 6 is another circuit diagram of the power supply in accordance with an embodiment of the invention.

Meanwhile, FIG. 6 is another circuit diagram of the power supply in accordance with an embodiment of the invention. As shown in FIG. 6, the power supply 200 according to at least one embodiment further includes a fourth capacitor C4 between a terminal, which outputs the first output voltage V1 and the second output voltage V2, and a ground.

In accordance with at least one embodiment, the fourth capacitor C4 is applied to stabilize the first output voltage V1 and the second output voltage V2, and any type of capacitor, such as a universal electrolytic capacitor, can be used if it can achieve the above functions.

In accordance with at least one embodiment, the power supply 200, which is configured as above, performs the following exemplary operations.

Referring to FIGS. 2 and 3, until the power is applied and the charging of the second capacitor C2 is started, thus, in an interval of t0~t1 of FIG. 3, the controller 230 outputs the low-level second control signal B, which turns off the second switching unit SW2, to the second switching unit SW2 while outputting the high-level first control signal A, which turns on the first switching unit SW1, to the first switching unit SW1.

Accordingly, in the interval of t0~t1 of FIG. 3, the first switching unit SW1 of the first output unit 210 is turned on, and the second switching unit SW2 of the second output unit 220 is turned off.

In accordance with at least one embodiment, the above switching process of the first switching unit SW1 and the second switching unit SW2 will be described in detail below with reference to FIGS. 2 to 5.

In the interval of t0~t1 of FIG. 3, since the voltage of the second capacitor C2 is 0V, the voltage divided by the first voltage division unit 231 is also 0V. Accordingly, 0V is applied to a gate of the third switching unit SW3 so that the third switching unit SW3, which is an N-channel FET, is turned off. Due to this, the voltage of the first capacitor C1 is applied to a gate of the fourth switching unit SW4 so that the fourth switching unit SW4, which is an N-channel FET, is turned on.

Therefore, in the interval of t0~t1 of FIG. 3, the first switching unit SW1, which is a P-channel FET, is turned on according to the turn-on (high-level first control signal) of the fourth switching unit SW4. Therefore, in the interval of t0~t1 of FIG. 3, it is possible to output the first output voltage V1 in a direction ① of the first output unit 210 directly by charging the first capacitor C1 within a short time.

In accordance with at least one embodiment, the voltage divided by the second voltage division unit 232 is applied to a gate of the fifth switching unit SW5, but in the interval of t0~t1 of FIG. 3, the voltage divided by the second voltage division unit 232 is charged in the third capacitor C3 first. Accordingly, until the third capacitor C3 is fully charged, thus, in the interval of t0~t1 of FIG. 3, the fifth switching unit SW5 is turned off.

In accordance with at least one embodiment, in the interval of t0~t1 of FIG. 3, the second switching unit SW2, which is a P-channel FET, is turned off according to the turn-off (low-level second control signal) of the fifth switching unit SW5. Accordingly, as shown in FIG. 3, in the interval of t0~t1, the charging of the second capacitor C2 is not started.

In accordance with at least one embodiment, as in FIG. 5, when the comparator 233 is connected to the third capacitor C3 and the fifth switching unit SW5, in the interval of t0~t1 of FIG. 3, since the third capacitor C3 is not fully charged, the voltage of the third capacitor C3 is lower than the preset reference voltage (Vref, for example, turn-on voltage of the fifth switching unit SW5). Thus, the comparator 233 outputs the output voltage having a low level to the fifth switching unit SW5.

Accordingly, the fifth switching unit SW5 is turned off. Thus, since the second switching unit SW2 is also turned off, the charging of the second capacitor C2 is also not started in an interval of t0~t1 in FIG. 5.

In accordance with at least one embodiment, the controller 230 controls the first output voltage V1 to be output in the direction ① of the first output unit 210 in the interval of t0~t1 of FIG. 3, thus, until the power is applied and the charging of the second capacitor C2 is started, resulting in a reduction in the startup time.

Next, referring to FIGS. 2 and 3, until the charging of the second capacitor C2 is started and the charging of the second capacitor C2 is completed, thus, in an interval of t1~t2 of FIG. 3, the controller 230 outputs the high-level second control signal B, which turns on the second switching unit SW2, to the second switching unit SW2 while outputting the high-level first control signal A, which turns on the first switching unit SW1, to the first switching unit SW1. Accordingly, in the interval of t1~t2 of FIG. 3, both of the first switching unit SW1 of the first output unit 210 and the second switching unit SW2 of the second output unit 220 are turned on.

In accordance with at least one embodiment, the above switching process of the first switching unit SW1 and the second switching unit SW2 will be described in detail below with reference to FIGS. 2 to 5.

In the interval of t1~t2 of FIG. 3, since the second capacitor C2 is not fully charged, the first switching unit SW1, which is a P-channel FET, has the same switching process as the switching process in the interval of t0~t1 of FIG. 3. Accordingly, the first switching unit SW1 is turned on in the interval of t1~t2 of FIG. 3. Therefore, in the interval of t1~t2 of FIG. 3, the first output voltage V1 can be continuously output in the direction ① of the first output unit 210 following the interval of t0~t1 of FIG. 3.

Further, in the interval of t1~t2 of FIG. 3, the third capacitor C3 is fully charged. Accordingly, the voltage of the third capacitor C3 is applied to the gate of the fifth switching unit SW5 so that the fifth switching unit SW5, which is an N-channel FET, is turned on.

Thus, in the interval of t1~t2 of FIG. 3, the second switching unit SW2, which is a P-channel FET, is turned on according to the turn-on (high-level second control signal) of the fifth switching unit SW5. Therefore, as shown in FIG. 3, the second capacitor C2 is charged in the interval of t1~t2. Accordingly, the second output voltage V2 is output in a direction ② of the second output unit 220.

Meanwhile, as in FIG. 5, when the comparator 233 is connected to the third capacitor C3 and the fifth switching unit SW5, in the interval of t1~t2 of FIG. 3, since the third capacitor C3 is fully charged, the voltage of the third capacitor C3 is higher than the preset reference voltage (Vref, for example, turn-on voltage of the fifth switching unit SW5). Thus, the comparator 233 outputs the output voltage having a high level to the fifth switching unit SW5.

Accordingly, the fifth switching unit SW5 is turned on. Thus, the second switching unit SW2 is also turned on. Therefore, the second capacitor C2 is also charged in an interval of t1~t2 in FIG. 5. Accordingly, the second output voltage V2 can be output in the direction ② of the second output unit 220.

Therefore, the controller 230 of the present embodiment may control the second output voltage V2 (direction ②) to be output with the first output voltage V1 (direction ①) in the interval of t1~t2 of FIG. 3, that is, until the charging of the second capacitor C2 is started and the charging of the second capacitor C2 is completed.

Next, referring to FIGS. 2 and 3, after the charging of the second capacitor C2 is completed, that is, in an interval after t2 of FIG. 3, the controller 230 may output the high-level second control signal B, which turns on the second switching unit SW2, to the second switching unit SW2 while outputting the low-level first control signal A, which turns off the first switching unit SW1, to the first switching unit SW1. Accordingly, in the interval after t2 of FIG. 3, the first switching unit SW1 of the first output unit 210 is turned off and the second switching unit SW2 of the second output unit 220 is turned on.

In accordance with at least one embodiment, the above switching process of the first switching unit SW1 and the second switching unit SW2 will be described in detail below with reference to FIGS. 2 to 5.

In the interval after t2 of FIG. 3, since the charging of the second capacitor C2 is completed, the voltage divided by the first voltage division unit 231 is applied to the gate of the third switching unit SW3.

In accordance with at least one embodiment, the third switching unit SW3, which is an N-channel FET, is turned on. Accordingly, a voltage of 0V is applied to the gate of the fourth switching unit SW4 so that the fourth switching unit SW4, which is an N-channel FET, is turned off.

In accordance with at least one embodiment, in the interval after t2 of FIG. 3, the first switching unit SW1, which is a P-channel FET, is turned off according to the turn-off (low-level first control signal) of the fourth switching unit SW4. Accordingly, the first output voltage V1 cannot be output in the direction of ①.

Meanwhile, in the interval after t2 of FIG. 3, since the third capacitor C3 is still charged, the second switching unit SW2, which is a P-channel FET, has the same switching process as the switching process in the interval of t1~t2 of FIG. 3. Accordingly, the second switching unit SW2 is also turned on in the interval after t2 of FIG. 3. Therefore, in the interval after t2, the second output voltage V2 can be continuously output in the direction ② of the second output unit 220 following the interval of t1~t2.

Meanwhile, as in FIG. 5, even when the comparator 233 is connected to the third capacitor C3 and the fifth switching unit SW5, since the third capacitor C3 is still charged in the interval after t2 of FIG. 3, the voltage of the third capacitor C3 is higher than the preset reference voltage Vref (for example, turn-on voltage of the filth switching unit SW5). Thus, the comparator 233 outputs the output voltage having a high level to the fifth switching unit SW5.

Accordingly, the fifth switching unit SW5 is turned on and thus the second switching unit SW2 is also turned on in FIG. 5. Therefore, in an interval after t2 in FIG. 5, the second output voltage V2 can be continuously output in the direction ② of the second output unit 220 following the interval of t1~t2.

Therefore, in the interval after t2 of FIG. 3, that is, after the charging of the second capacitor C2 is completed, the controller 230 of the present embodiment may control the second output voltage V2 to be output in the direction ② of the second output unit 220 without outputting the first output voltage V1 in the direction ① of the first output unit 210.

Through the above operation process, the power supply 200 according to various embodiments of the invention implements an output configuration (second output unit 220) for reduction in standby power and an output configuration (first output unit 210) for reduction in startup time together in the secondary-side single output terminal L1 of the transformer Tx, unlike the typical power supply 100 of FIG. 1.

Accordingly, compared to the conventional power supply 100 of FIG. 1, the power supply 200 of at least one embodiment of the invention reduces its volume by reducing the secondary-side winding of the transformer and also can remarkably reduce the number of components (for example, high-current output diodes D4 and D5 and output capacitor C3 implemented in the first output terminal L1 of FIG. 1) according to a plurality of secondary-side output terminals.

Therefore, the power supply 200 of at least one embodiment of the invention has non-obvious advantages, such as circuit miniaturization, reduction in the number of components, and cost reduction as well as reduction in startup time as a power supply employing an output configuration for reduction in standby power.

Second Embodiment

Figures 7, 8:
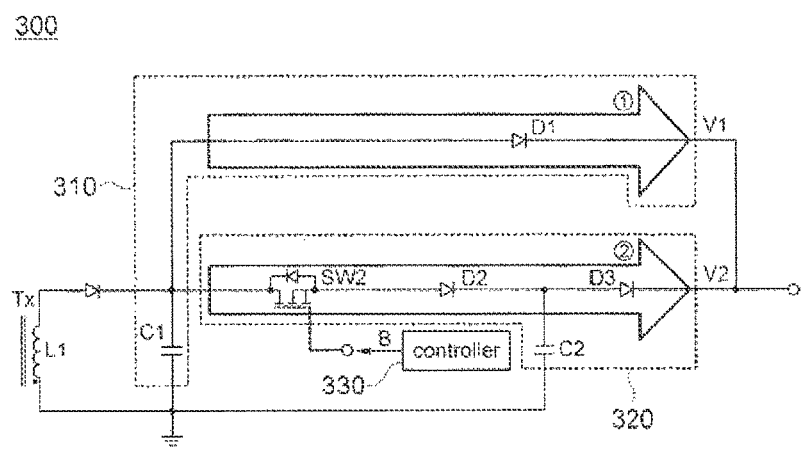
FIG. 7 is a schematic circuit diagram of a power supply in accordance with a second embodiment of the invention.
FIG. 8 is a view showing a control sequence related to the power supply in accordance with the second embodiment of the invention.

FIG. 7 is a schematic circuit diagram of a power supply in accordance with a second embodiment of the invention. As shown in FIG. 7, the power supply 300 of at least one embodiment of the invention includes a transformer Tx, a first output unit 310 including a first capacitor C1, a second output unit 320 including a second capacitor C2, and a controller 330.

Since the transformer Tx, the first and second capacitors C1 and C2, and the second output unit 320 of at least one embodiment of the invention are the same as those of the first embodiment, descriptions thereof will be omitted. Therefore, hereinafter, components (first output unit 310, controller 330, etc.) and operation processes different from those of the power supply 200 of the first embodiment will be mainly described.

Figure 9:
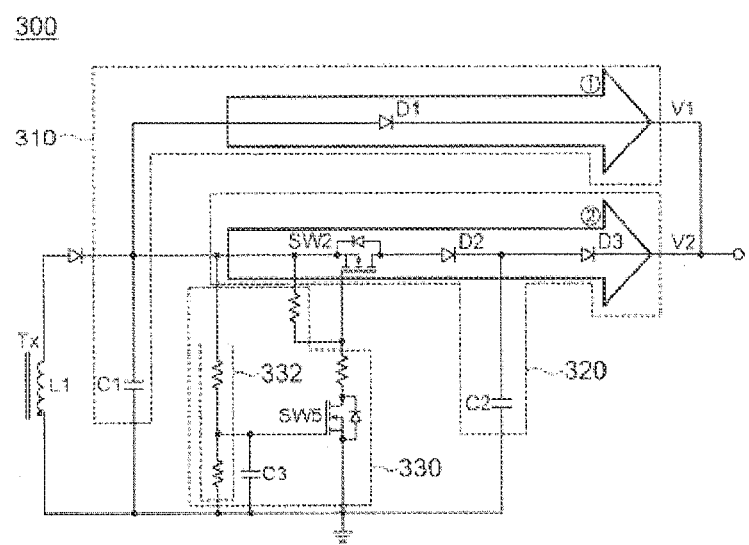
FIG. 9 is a detailed circuit diagram of the power supply of FIG. 7 in accordance with the second embodiment of the invention.

FIG. 8 is a view showing a control sequence related to the power supply 300 in accordance with at least one embodiment of the invention, and FIG. 9 is a detailed circuit diagram of the power supply 300 of FIG. 7 in accordance with the second embodiment of the invention.

First, as shown in FIGS. 7 and 9, the first output unit 310 according to at least one embodiment includes the first capacitor C1 and be connected to a secondary-side single output terminal L1 of the transformer Tx to output a first output voltage V1.

As shown in FIGS. 7 and 9, the first output unit 310 according to at least one embodiment includes a first diode D1 connected to the single output terminal L1 and the first capacitor C1 to output the first output voltage V1. In accordance with at least one embodiment, the first output unit 310 of the present embodiment is different from the first output unit 210 of the first embodiment in that it does not include a first switching unit SW1.

Therefore, embodiments of the invention can reduce switching elements (for example, FETs) than the first embodiment. In this respect, it is advantageous to cost reduction than the first embodiment.

Meanwhile, the controller 330 according to at least one embodiment controls the first output voltage V1 to be output until power is applied to the power supply and charging of the second capacitor C2 is started. This will be described in detail in the following operation process.

In accordance with at least one embodiment, the controller 330 is not needed to output a first control signal A for controlling a first switching unit SW1 since the first output unit 310 does not include the first switching unit SW1.

In accordance with at least one embodiment, the controller 330 outputs only a second control signal B for controlling on/off of a second switching unit SW2 to the second switching unit SW2 as shown in FIGS. 7 and 8.

In accordance with at least one embodiment, the controller 330 is needed to include only a configuration for controlling the second switching unit SW2 and thus may include a second voltage division unit 232, a fifth switching unit SW5, and a third capacitor C3 as shown in FIG. 9.

In accordance with at least one embodiment, since the second voltage division unit 232, the fifth switching unit SW5, and the third capacitor C3 of at least one embodiment are the same as those of the first embodiment, descriptions thereof will be omitted.

Since the controller 330 of at least one embodiment, which is configured as above, does not require the configuration (first voltage division unit 231, third switching unit SW3, and fourth switching unit SW4) of the first embodiment for controlling the first switching unit SW1, it is possible to simply implement a circuit of the controller than the first embodiment. Therefore, it is more advantageous to circuit miniaturization than the first embodiment.

Meanwhile, in the present embodiment, like the first embodiment, the level of the second control signal B for turning on the second switching unit SW2 is set to a high level, and the level of the second control signal B for turning off the second switching unit SW2 is set to a low level, but the level of the second control signal B is not necessarily limited thereto. Thus, the level of the second control signal B for turning on the second switching unit SW2 may be set to a low level, and the level of the second control signal B for turning off the second switching unit SW2 may be set to a high level.

Further, the controller 330 of the present embodiment, like the first embodiment, further includes a comparator connected to the third capacitor C3 and the fifth switching unit SW5. At this time, the comparator of the present embodiment is the same configuration as the comparator 233 of FIG. 5 in the first embodiment. Thus, a description thereof will be omitted.

Meanwhile, the power supply 300 of the present embodiment, like the first embodiment, may further include a capacitor between a terminal, which outputs the first output voltage V1 and a second output voltage V2, and a ground. At this time, the capacitor is the same as the fourth capacitor C4 of FIG. 6 in the first embodiment. Thus, a description thereof will be omitted.

In accordance with at least one embodiment, the power supply 300, which is configured as above, performs the following exemplary operations.

Referring to FIGS. 7 and 8, until the power is applied and the charging of the second capacitor C2 is started, that is, in an interval of t0~t1 of FIG. 8, the first capacitor C1 is charged within a short time to output the first output voltage V1 in a direction ① of the first output unit 310 directly.

In accordance with at least one embodiment, the controller 330 outputs the low-level second control signal B, which turns off the second switching unit SW2, to the second switching unit SW2. Accordingly, in the interval of t0~t1 of FIG. 8, the second switching unit SW2 of the second output unit 320 is turned off.

In accordance with at least one embodiment, the above switching process of the second switching unit SW2 will be described in detail below with reference to FIGS. 7 to 9.

In the interval of t0~t1 of FIG. 8, the voltage divided by the second voltage division unit 232 is applied to a gate of the fifth switching unit SW5, but in the interval of t0~t1 of FIG. 8, the voltage divided by the second voltage division unit 232 is charged in the third capacitor C3 first. Accordingly, until the third capacitor C3 is fully charged, thus, in the interval of t0~t1 of FIG. 8, the fifth switching unit SW5 is turned off.

Thus, in the interval of t0~t1 of FIG. 8, the second switching unit SW2, which is a P-channel FET, is turned off according to the turn-off (low-level second control signal) of the fifth switching unit SW5. Accordingly, as shown in FIG. 8, in the interval of t0~t1, the charging of the second capacitor C2 is not started.

Meanwhile, as in the first embodiment, when the comparator is connected to the third capacitor C3 and the fifth switching unit SW5 (refer to FIG. 5), in the interval of t0~t1 of FIG. 8, since the third capacitor C3 is not fully charged, the voltage of the third capacitor C3 is lower than a preset reference voltage (Vref, for example, turn-on voltage of the fifth switching unit SW5). Thus, the comparator outputs an output voltage having a low level to the fifth switching unit SW5.

Accordingly, the fifth switching unit SW5 is turned off. Thus, since the second switching unit SW2 is also turned off, the charging of the second capacitor C2 is not started even in the interval of t0~t1 in the configuration in which the comparator is applied to the controller 330.

Therefore, the controller 330 of at least one embodiment controls the first output voltage V1 to be output in the direction ① of the first output unit 310 in the interval of t0~t1 of FIG. 8, that is, until the power is applied and the charging of the second capacitor C2 is started, resulting in a reduction in startup time.

Next, referring to FIGS. 7 and 8, after the charging of the second capacitor C2 is started, that is, in intervals of t1~t2 and after t2 of FIG. 8, the first output voltage V1 can be continuously output in the direction θ of the first output unit 310 following the interval of t0~t1 of FIG. 8.

In accordance with at least one embodiment, the controller 330 outputs the high-level second control signal B, which turns on the second switching unit SW2, to the second switching unit SW2. Accordingly, in the intervals of t1~t2 and after t2 of FIG. 8, the second switching unit SW2 of the second output unit 320 is turned on.

In accordance with at least one embodiment, the above switching process of the second switching unit SW2 will be described in detail below with reference to FIGS. 7 to 9.

In the intervals of t1~t2 and after t2 of FIG. 8, the third capacitor C3 is fully charged. Accordingly, a voltage of the third capacitor C3 is applied to a gate of the fifth switching unit SW5 so that the fifth switching unit SW5, which is an N-channel FET, is turned on.

Thus, in the intervals of t1~t2 and after t2 of FIG. 8, the second switching unit SW2, which is a P-channel FET, is turned on according to the turn-on of the fifth switching unit SW5 (high-level second control signal). Accordingly, as shown in FIG. 8, in the interval of t1~t2, the second capacitor C2 is charged, and in the interval after t2, the charging of the second capacitor C2 is completed. Therefore, the second output voltage V2 is output in a direction ② of the second output unit 320.

Meanwhile, as in the first embodiment, when the comparator is connected to the third capacitor C3 and the fifth switching unit SW5 (refer to FIG. 5), in the intervals of t1~t2 and after t2 of FIG. 8, since the third capacitor C3 is fully charged, the voltage of the third capacitor C3 is higher than a preset reference voltage (Vref, for example, turn-on voltage of the fifth switching unit SW5). Thus, the comparator outputs an output voltage having a high level to the fifth switching unit SW5.

Accordingly, the fifth switching unit SW5 is turned on. Thus, the second switching unit SW2 is also turned on. Therefore, even in the configuration in which the comparator is applied to the controller 330, the second capacitor C2 is charged in the interval of t1~t2, and in the interval after t2, the charging of the second capacitor C2 is completed. Thus, the second output voltage V2 is output in the direction ② of the second output unit 320.

Therefore, the controller 330 of at least one embodiment controls the second output voltage V2 (direction ②) to be output with the first output voltage V1 (direction ①) in the intervals of t1~t2 and after t2 of FIG. 8, that is, after the charging of the second capacitor C2 is started.

Through the above operation process, the power supply 300 of at least one embodiment implements an output configuration (second output unit 320) for reduction in standby power and an output configuration (first output unit 310) for reduction in startup time together in the secondary-side single output terminal L1 of the transformer Tx, like the power supply 200 of the first embodiment.

Accordingly, compared to the conventional power supply 100 of FIG. 1, the power supply 300 of at least one embodiment also reduces its volume by reducing the secondary-side winding of the transformer and reduces the number of components (for example, high-current output diodes D4 and D5 and output capacitor C3 implemented in the first output terminal L1 of FIG. 1) according to a plurality of secondary-side output terminals.

Therefore, the power supply 300 of at least one embodiment, like the first embodiment, has non-obvious advantages such as circuit miniaturization, reduction in the number of components, and cost reduction as well as reduction in startup time as a power supply employing an output configuration for reduction in standby power.

As described above, the power supply including the above configuration reduces the volume of the transformer by implementing an output configuration for reduction in standby power and an output configuration for reduction in startup time together in the secondary-side single output terminal of the transformer, thus reducing the number of components (for example, high-current output diode and output capacitor) as well.

Therefore, it is possible to achieve circuit miniaturization, reduction in the number of components, and cost reduction as well as reduction in startup time in a power supply employing an output configuration for reduction in standby power.

The functions of the various elements shown in the drawings may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "controller" should not be construed to refer exclusively to hardware capable of executing software, and may implicitly include, without limitation, microprocessor (MCU), digital signal processor (DSP) hardware, read-only memory (ROM) for storing software, random access memory (RAM), and non-volatile storage.

In the claims hereof, any element expressed as a means for performing a specified function is intended to encompass any way of performing that function including, for example, a combination of circuit elements which performs that function or software in any form, including, therefore, firmware, microcode or the like, combined with appropriate circuitry for executing that software to perform the function.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device. Reference in the specification to "connect" or "connecting", as well as other variations thereof, means that an element is directly connected to the other element or indirectly connected to the other element through another element.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A power supply comprising:
   a transformer comprising a single output terminal on a secondary side;
   a first output unit comprising a first capacitor and connected to the single output terminal to output a first output voltage;
   a second output unit comprising a second capacitor having a larger capacity than the first capacitor and connected to the single output terminal to output a second output voltage; and
   a controller configured to control the first output voltage to be output until power is applied and charging of the second capacitor is started.

2. The power supply according to claim 1, wherein the controller is configured to control the second output voltage to be output with the first output voltage until the charging of the second capacitor is started and the charging of the second capacitor is completed, and further configured to control the second output voltage to be output without outputting the first output voltage after the charging of the second capacitor is completed.

3. The power supply according to claim 2, wherein the first output unit comprises:
   a first switching unit connected to the single output terminal and the first capacitor, and
   a first diode connected to the first switching unit to output the first output voltage.

4. The power supply according to claim 3, wherein the second output unit comprises:
   a second switching unit connected to the single output terminal;
   a second diode connected to the second switching unit and the second capacitor; and
   a third diode connected to the second capacitor and the second diode to output the second output voltage.

5. The power supply according to claim 4, wherein the controller is further configured to output a first control signal for controlling on/off of the first switching unit to the first switching unit and to output a second control signal for controlling on/off of the second switching unit to the second switching unit.

6. The power supply according to claim 5, wherein the controller is further configured to
   output the second control signal of a level, which turns off the second switching unit, to the second switching unit while outputting the first control signal of a level, which turns on the first switching unit, to the first switching unit until the power is applied and the charging of the second capacitor is started,
   output the second control signal of a level, which turns on the second switching unit, to the second switching unit while outputting the first control signal of the level, which turns on the first switching unit, to the first switching unit until the charging of the second capacitor is started and the charging of the second capacitor is completed, and
   output the second control signal of the level, which turns on the second switching unit, to the second switching unit while outputting the first control signal of a level, which turns off the first switching unit, to the first switching unit after the charging of the second capacitor is completed.

7. The power supply according to claim 6, wherein the controller comprises:
   a first voltage division unit connected in parallel to the second capacitor to divide a voltage of the second capacitor;
   a third switching unit applied with the voltage divided by the first voltage division unit;
   a fourth switching unit connected to the first switching unit and the third switching unit;
   a second voltage division unit connected in parallel to the first capacitor to divide a voltage of the first capacitor;
   a fifth switching unit connected to the second voltage division unit and the second switching unit; and
   a third capacitor connected to the second voltage division unit and the fifth switching unit to charge the voltage divided by the second voltage division unit.

8. The power supply according to claim 7, wherein the controller further comprises:
   a comparator connected to the third capacitor and the fifth switching unit.

9. The power supply according to claim 8, wherein the comparator is configured to output an output voltage having a high level to the fifth switching unit when a voltage of the third capacitor is higher than a preset reference voltage, and to output an output voltage having a low level to the fifth switching unit when the voltage of the third capacitor is lower than the reference voltage.

10. The power supply according to claim 2, further comprising:
    a fourth capacitor between a terminal, which is configured to output the first output voltage and the second output voltage, and a ground to stabilize the first output voltage and the second output voltage.

11. The power supply according to claim 1, wherein the controller is further configured to control the second output voltage to be output with the first output voltage after the charging of the second capacitor is started.

12. The power supply according to claim 11, wherein the first output unit comprises a first diode connected to the single output terminal and the first capacitor to output the first output voltage.

13. The power supply according to claim 12, wherein the second output unit comprises:
    a second switching unit connected to the single output terminal;
    a second diode connected to the second switching unit and the second capacitor; and
    a third diode connected to the second capacitor and the second diode to output the second output voltage.

14. The power supply according to claim 13, wherein the controller is further configured to output a second control signal for controlling on/off of the second switching unit to the second switching unit.

15. The power supply according to claim 14, wherein the controller is further configured to output the second control signal of a level, which turns off the second switching unit, to the second switching unit until the power is applied and the charging of the second capacitor is started, and to output the second control signal of a level, which turns on the second switching unit, to the second switching unit after the charging of the second capacitor is started.

16. The power supply according to claim 15, wherein the controller comprises:
    a second voltage division unit connected in parallel to the first capacitor to divide a voltage of the first capacitor;
    a fifth switching unit connected to the second voltage division unit and the second switching unit; and a third capacitor connected to the second voltage division unit and the fifth switching unit to charge the voltage divided by the second voltage division unit.

17. The power supply according to claim 16, wherein the controller further comprises a comparator connected to the third capacitor and the fifth switching unit.

18. The power supply according to claim 17, wherein the comparator is further configured to output an output voltage having a high level to the fifth switching unit when a voltage of the third capacitor is higher than a preset reference voltage, and to output an output voltage having a low level to the fifth switching unit when the voltage of the third capacitor is lower than the reference voltage.

19. The power supply according to claim 2, further comprising:
   a fourth capacitor between a terminal, which outputs the first output voltage and the second output voltage, and a ground to stabilize the first output voltage and the second output voltage.

20. The power supply according to claim 1, wherein the first capacitor is an electrolytic capacitor, and the second capacitor is an electrolytic capacitor or an electric double layer capacitor.

* * * * *